(12) United States Patent
Taylor (10) Patent No.: US 11,167,837 B2
(45) Date of Patent: Nov. 9, 2021

(54) AIRCRAFT WITH OUTBOARD THROTTLE QUADRANT ARRANGEMENTS

(71) Applicant: BAE SYSTEMS plc, London (GB)

(72) Inventor: Adam Taylor, Rochester (GB)

(73) Assignee: BAE SYSTEMS plc, London (GB)

( * ) Notice: Subject to any disclaimer, the term of this patent is extended or adjusted under 35 U.S.C. 154(b) by 197 days.

(21) Appl. No.: 16/092,888

(22) PCT Filed: Mar. 28, 2017

(86) PCT No.: PCT/GB2017/050862
§ 371 (c)(1),
(2) Date: Oct. 11, 2018

(87) PCT Pub. No.: WO2017/178790
PCT Pub. Date: Oct. 19, 2017

(65) Prior Publication Data
US 2019/0161170 A1 May 30, 2019

(30) Foreign Application Priority Data
Apr. 11, 2016 (GB) .................................. 1606076

(51) Int. Cl.
*B64C 13/04* (2006.01)
*B64C 13/12* (2006.01)

(52) U.S. Cl.
CPC .......... *B64C 13/0421* (2018.01); *B64C 13/12* (2013.01)

(58) Field of Classification Search
CPC ..... B64C 13/0421; B64C 13/12; B64C 13/04; B64D 31/04; G05G 1/01
See application file for complete search history.

(56) References Cited

U.S. PATENT DOCUMENTS

| 4,114,843 A * | 9/1978 | Robinson ............... G05G 9/047 244/229 |
| 4,494,061 A * | 1/1985 | Kaye ...................... B64D 31/04 318/628 |

(Continued)

FOREIGN PATENT DOCUMENTS

| FR | 3005032 A1 | 10/2014 | |
| GB | 2527924 A * | 1/2016 | ........... B64C 13/345 |
| WO | 2017/178790 A1 | 10/2017 | |

OTHER PUBLICATIONS

International Preliminary Report on Patentability received for PCT Application No. PCT/GB2017/050862. dated Oct. 25, 2018. 7 pages.

(Continued)

*Primary Examiner* — Joshua J Michener
*Assistant Examiner* — Arfan Y. Sinaki
(74) *Attorney, Agent, or Firm* — Finch & Maloney PLLC (57) ABSTRACT

An aircraft (101) is provided with a single centrally located inceptor (110) for controlling pitch and roll of the aircraft. The inceptor (110) is provided with a double grip (11, 112) so that it may be comfortably operated by either a pilot or a co-pilot. A central location for the inceptor ensures that its motion and position is visible to both pilot and co-pilot. Not only is this a benefit from a safety point of view but also during pilot training. Alternatively, two inceptors (411, 412) are provided in the centre console (406) adjacent to one another for operation respectively by the pilot and co-pilot and may be mechanically linked. Optionally, the aircraft may be provided with outboard throttle quadrants (117, 118) for operation respectively by the co-pilot and pilot. The outboard throttle quadrants may be mechanically linked together.

23 Claims, 6 Drawing Sheets (56) References Cited

U.S. PATENT DOCUMENTS

| | | | | |
|---|---|---|---|---|
| 5,427,336 A * | 6/1995 | Haggerty | ................ | B64C 13/12 244/229 |
| 5,900,710 A * | 5/1999 | Gautier | ............... | B64C 13/0421 318/675 |
| 6,000,662 A * | 12/1999 | Todeschi | ................ | B64C 13/12 244/223 |
| 6,347,770 B1 * | 2/2002 | Oyzerskiy | ........... | B64C 13/0421 244/234 |
| 8,844,880 B1 * | 9/2014 | Corliss | ................. | B64C 27/605 244/229 |
| 2010/0302074 A1 * | 12/2010 | Campagne | ............. | B64D 45/00 340/971 |
| 2014/0266979 A1 * | 9/2014 | Miener | ................. | B64D 43/00 345/1.3 |

OTHER PUBLICATIONS

Google based blog platform, 2009, Bushcaddy Flying Again; retrieved from the Internet on Sep. 27, 2016. URL: http://bushcaddy3670australia.blogspot.co.uk/2009/11/bushcaddy-flying-again.html. 10 pages.

Blog at WordPress.com, New Y-Stick Controls for A32 Vixxen, Foxbat Pilot; retrieved from the Internet on Sep. 27, 2016. URL: https://foxbatpilot.com/tag/y-stick/. 1 page.

International Search Report and Written Opinion received for PCT Application No. PCT/GB2017/050862. dated May 29, 2017. 12 pages.

GB Search Report under Section 17(5) received for GB Application No. 1606076.6, dated Sep. 29, 2016. 3 pages.

Tag Archives: Y-Stick, "Aeroprakt A32 Y-stick arrives in Australia," posted on the Internet on Dec. 29, 2016. URL: https://foxbatpilot.com/tag/y-stick/. 5 pages.

* cited by examiner

AIRCRAFT WITH OUTBOARD THROTTLE QUADRANT ARRANGEMENTS

This invention relates to aircraft, fixed wing or rotary wing, and particularly to arrangements for control sticks, such control sticks being operable by a pilot and a co-pilot.

A control stick is typically provided in an aircraft for permitting a pilot to control the flying surfaces of the aircraft. As a particular example, a control stick is used to control pitch and roll of the aircraft and a separate throttle control arrangement or thrust lever, often referred to as a throttle quadrant (or quadrants), is used to control aircraft engine thrust. A control stick for controlling pitch and roll is sometimes referred to as an inceptor, a joystick or a side stick. In classical joystick designs where there is some mechanical linkage between the joystick and flying surfaces, the forces which act on the aircraft during flight are transmitted to the joystick in the form of resistance and deflection. Additionally, in some classical joystick designs, both pilot stations are mechanically linked. In modern aircraft which employ fly by wire systems, there is no such mechanical feedback and the inceptors which are used with such systems either have no feedback or they rely on haptic or active transmission of information to the pilot and incorporate force feedback systems employing force and position sensors and drive motors.

One known aircraft includes throttle quadrants and two unlinked, passive inceptors. The throttle quadrants are mounted adjacent to one another in a centre console between the pilot and co-pilot and each are operable, respectively, by the pilot and by the co-pilot The pilot and co-pilot are each provided with an inceptor, their respective inceptors being positioned at outboard locations so that the pilot may operate his/her inceptor with the left hand, for example, and the co-pilot may operate his/her inceptor with the right hand. Owing to this choice of location for the two inceptors, the pilot's inceptor is not easily visible to the co-pilot and likewise, the co-pilot's inceptor is not easily visible to the pilot. Therefore, inputs to the inceptors made by the pilot who is currently flying the aircraft cannot be easily monitored by the other pilot. For example, since the inceptors are unlinked, a pilot might be unaware that the co-pilot is inputting some control to the flying surfaces via his inceptor and may at the same time be moving his own inceptor. Such a situation is undesirable from a safety point of view.

Accordingly, the invention seeks to mitigate, alleviate or eliminate the above-mentioned disadvantages.

Aspects of the invention comprise an aircraft including control stick arrangements as described in the appended claims.

According to a first aspect of invention there is provided an aircraft having a cockpit for occupation by a pilot and a co-pilot seated side by side, the cockpit including a single control stick arrangement for controlling pitch and roll of the aircraft and being located in a central region of the cockpit between the pilot and co-pilot for operation by the pilot and/or the co-pilot.

In one embodiment, the single control stick arrangement incorporates first and second grips mounted on a control stick in the same horizontal plane. The grips may be contoured so that the first grip can be comfortably operated by a left-hand and the second grip can be comfortably operated by a right-hand.

The single control stick arrangement may include a jam mitigation means such as that described in GB-A-2527924.

In one embodiment, an additional control stick arrangement for controlling pitch and roll of the aircraft is located in a central region of the cockpit for operation by the pilot or the co-pilot and adjacent to the single control stick arrangement. Advantageously, this embodiment provides some redundancy as a safety measure should there be a problem with the operation of one of the control sticks.

In one embodiment, the aircraft includes a fly by wire system which includes the single control stick arrangement or the combination of the single control stick and the additional control stick arrangement. In such an embodiment, the single control stick and additional control stick arrangements may be provided with at least one of a force sensor and a position sensor for monitoring movement of a control stick and outputting signals proportional to said movement to the fly by wire system.

The single control stick or the combination of the single control stick and the additional control stick arrangements may be mounted in a centre console of the cockpit.

A single control stick arrangement and an additional control stick arrangement may be passively linked together so that when one is moved the other moves in the same manner. A passive linkage may comprise any suitable, mechanical conventional arrangement which may, conveniently, be mounted in a centre console. As both control stick arrangements are located close to one another, such a mechanical linkage can be kept simple but may also include jam mitigation means. Alternatively, the single control stick arrangement and additional control stick arrangement may be electrically linked using known active inceptor arrangements.

Advantageously, by providing a single, centrally located control stick (or inceptor), or alternatively the combination of a centrally located, single control stick and additional control stick, the motion and position of the control stick is visible to both pilot and co-pilot. Not only is this a benefit from a safety point of view but also during pilot training.

In order to prevent operation of a centrally located control stick arrangement impeding operation of the throttle quadrants (and vice versa), the throttle quadrant operation may be re-located to outboard locations. Thus, in a further embodiment, the aircraft includes first and second throttle quadrant arrangements positioned at outboard locations for operation, respectively, by the pilot and the co-pilot of the aircraft.

The first and second throttle quadrant arrangements may be linked together either mechanically or electrically. A mechanical linkage may comprise any appropriate, conventional arrangement and may be located underneath or above the floor of the cockpit. Any linkage can be comparatively simple because the throttle quadrant is required to move along one axis only, that is, fore and aft (compared with an inceptor which is required to move in two axes; a fore and aft movement controlling pitch of the aircraft and a left to right movement controlling roll). An electrical linkage may utilise throttle position sensors and drive motors (which may form a part of an autopilot system) configured as part of a conventional slaved position-to-position drive system. For more accurate "position following" performance, each throttle quadrant arrangement may include a force transducer as well. However, as throttle quadrant movement is comparatively slow, an arrangement where a slave follows a position of a master may give adequate performance.

As an alternative to relocating the throttle quadrant operation to outboard locations, in another embodiment, the single control stick arrangement is provided with one or more thrust control elements. This element may be, for example a small joystick which may be operated by the thumb or a thumbwheel. Preferably, in the embodiment where a single control stick incorporates two grips and the embodiment which includes a single control stick arrangement and an additional control stick arrangement, both grips and both single control stick and additional control stick arrangements are provided with such a thrust control element. In this way, both pilot and co-pilot can independently operate a thrust control element. Such thrust control elements may be mechanically or electrically linked.

The optional and alternative features of the various embodiments described herein may be combined as appropriate, as would be apparent to a skilled person.

These and other aspects, features and advantages of the invention will be apparent from, and elucidated with reference to, the embodiments described hereinafter.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 1:
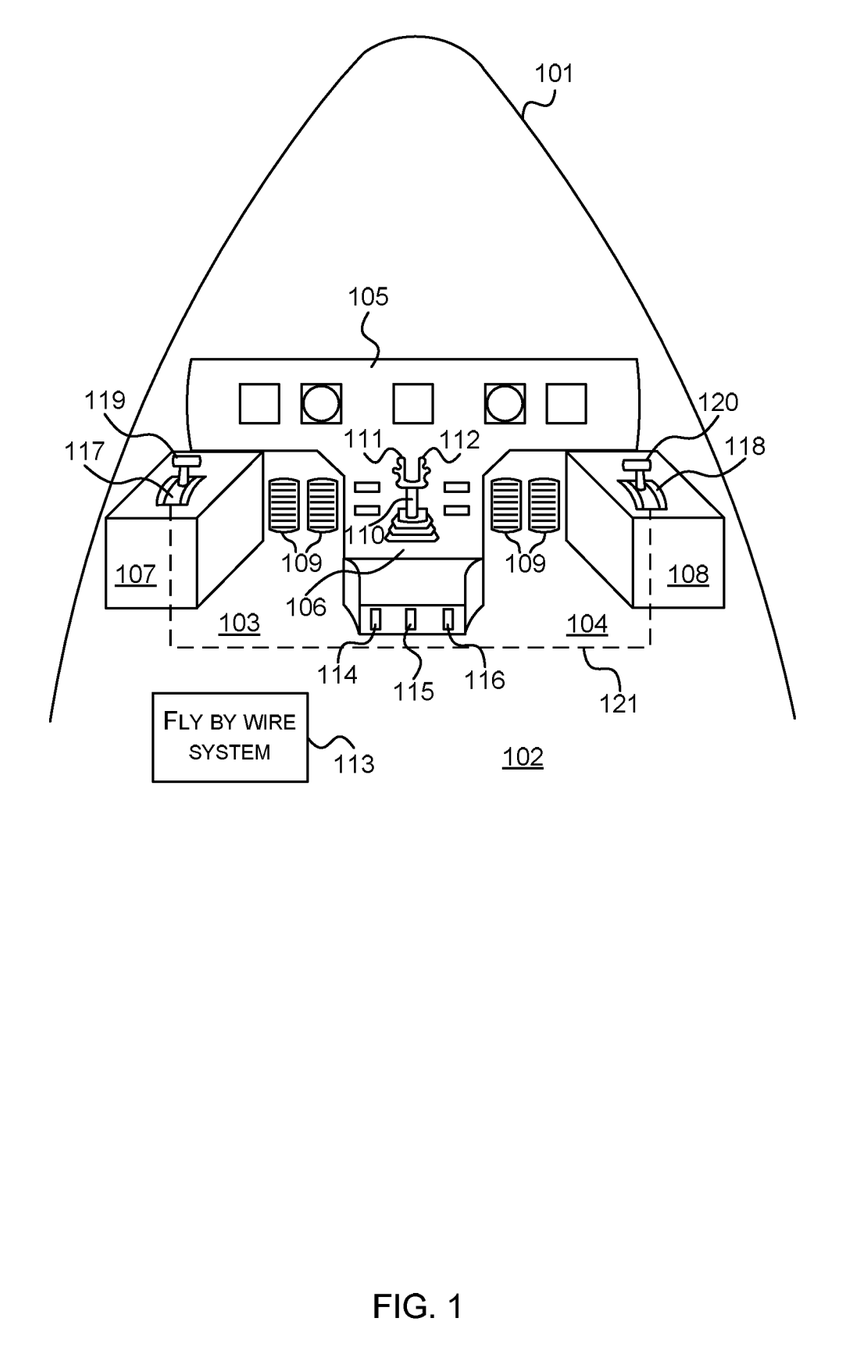
FIG. 1 is a simplified cutaway view of a part of an aircraft in accordance with a first embodiment showing a single, centrally mounted inceptor and mechanically linked outboard throttle quadrants.

Referring now to FIG. 1, an aircraft 101 includes a cockpit 102 where a pilot and co-pilot may be located at positions indicated by reference numerals 103 and 104 respectively. The cockpit 102 includes a display panel 105, centre console 106 and side consoles 107, 108. Rudder pedals 109 are provided for operation by the pilot and co-pilot. Mounted on the centre console 106 is a single control stick arrangement (or "inceptor") 110. The inceptor 110 is provided with two grips 111, 112. The two grips are mounted in the same horizontal plane with a first grip 111 being a closer to the pilot's location 103 and contoured so that it may be comfortably operated by the pilot's right hand. A second grip 112 is closer to the co-pilot's location 104 and contoured so that it may be comfortably operated by the co-pilot's left hand. In this example, the inceptor 110 is a passive inceptor having a fixed force feel characteristic which is provided by springs and dampers (not shown). The inceptor 110 is linked to a fly by wire system schematically represented by box 113 and is operable to control pitch and roll of the aircraft 101 in a conventional manner. For example, a fore and aft movement of the inceptor 110 controls aircraft pitch and a sideways, left to right movement of the inceptor controls aircraft roll. Inputs made to the inceptor by either the pilot or co-pilot are monitored by force and position sensors 114, 115 respectively, located in the centre console. The inceptor 110 is also provided with jam mitigation means 116.

Mounted on the side consoles 107,108 are throttle quadrant arrangements 117 118, respectively, positioned at outboard locations. A first throttle quadrant arrangement 117 incorporates a first thrust lever 119 which can be moved in a fore and aft direction by the pilot, located at position 103, with the left hand. A second throttle quadrant arrangement 118 incorporates a second thrust lever 120 which can be moved in a fore and aft direction, by the co-pilot located at position 104, with the right hand. In this embodiment, the first and second throttle quadrant arrangements 117, 118 are linked together by way of a mechanical linkage represented by the dotted line 121 and located underneath the floor of the cockpit 102. The mechanical linkage 121 is arranged so that if either of the first and second thrust levers 119, 120 is moved, the other thrust lever also moves in the same direction and by the same amount.

Figure 2:
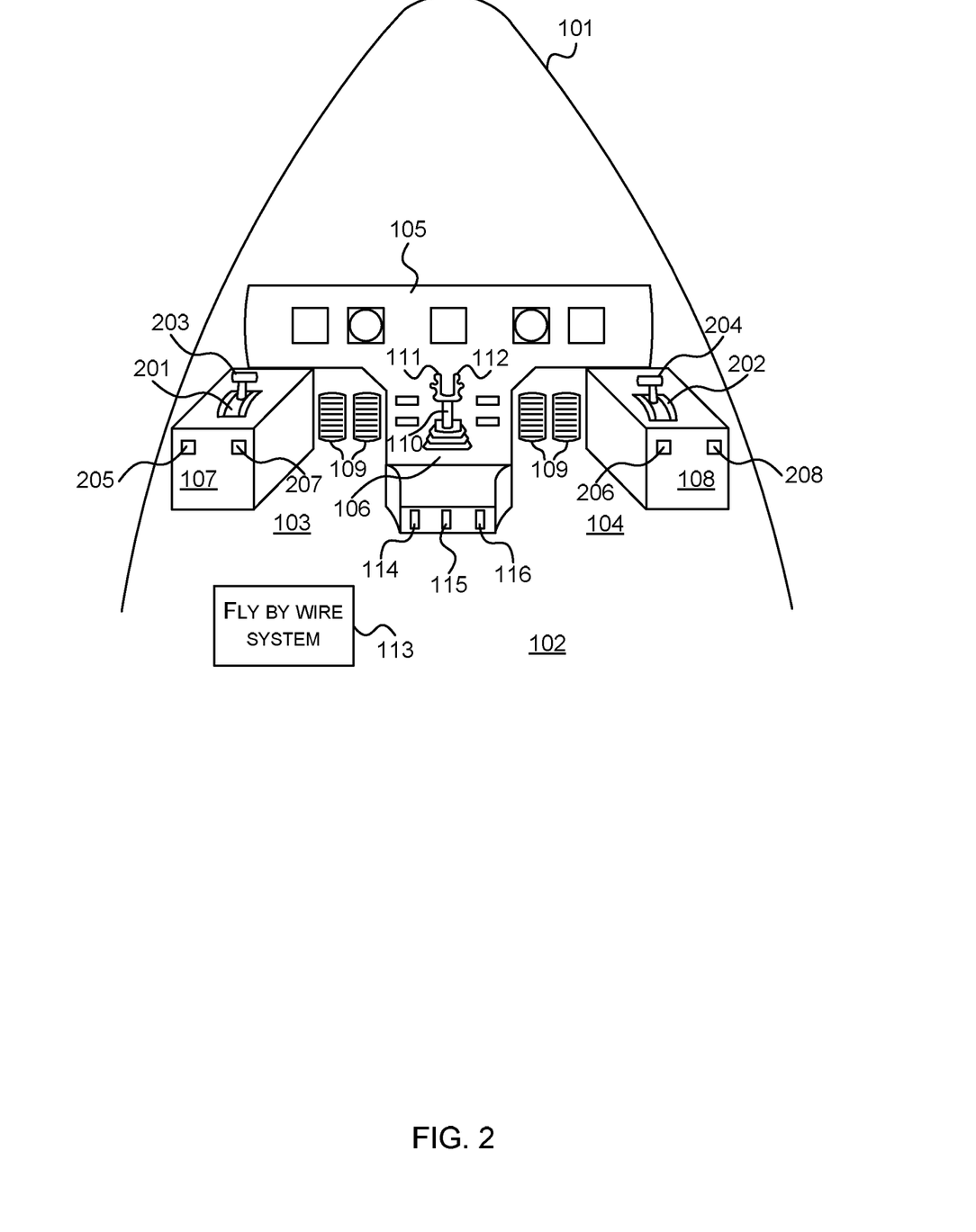
FIG. 2 is a simplified cutaway view of a part of an aircraft in accordance with a second embodiment showing a single, centrally mounted inceptor and electrically linked outboard throttle quadrants.

Referring now to FIG. 2 where like reference numerals refer to the same components as described above in relation to FIG. 1, first and second throttle quadrant arrangements 201, 202 are located respectively on the side consoles 107, 108 and are electrically linked. The first throttle control arrangement 201 includes a first thrust lever 203 and the second throttle control arrangement 202 includes a second thrust lever 204. In this example, each throttle control arrangement 201, 202 is provided with a respective position sensor 205, 206 and with a respective drive motor 207, 208. When, for example the first thrust lever 203 is moved, the associated position sensor 205 detects the movement and a corresponding drive signal is provided to the drive motor 208 associated with the second throttle quadrant arrangement 202 in order to drive the second thrust lever 204 so that it follows the motion of the first thrust lever 203. Similarly, if the second thrust lever 204 is moved, the associated position sensor 206 detects the movement and a corresponding drive signal is provided to the drive motor 207 associated with the first throttle arrangement 201 so that it follows the motion of the second thrust lever 204.

Figure 3:
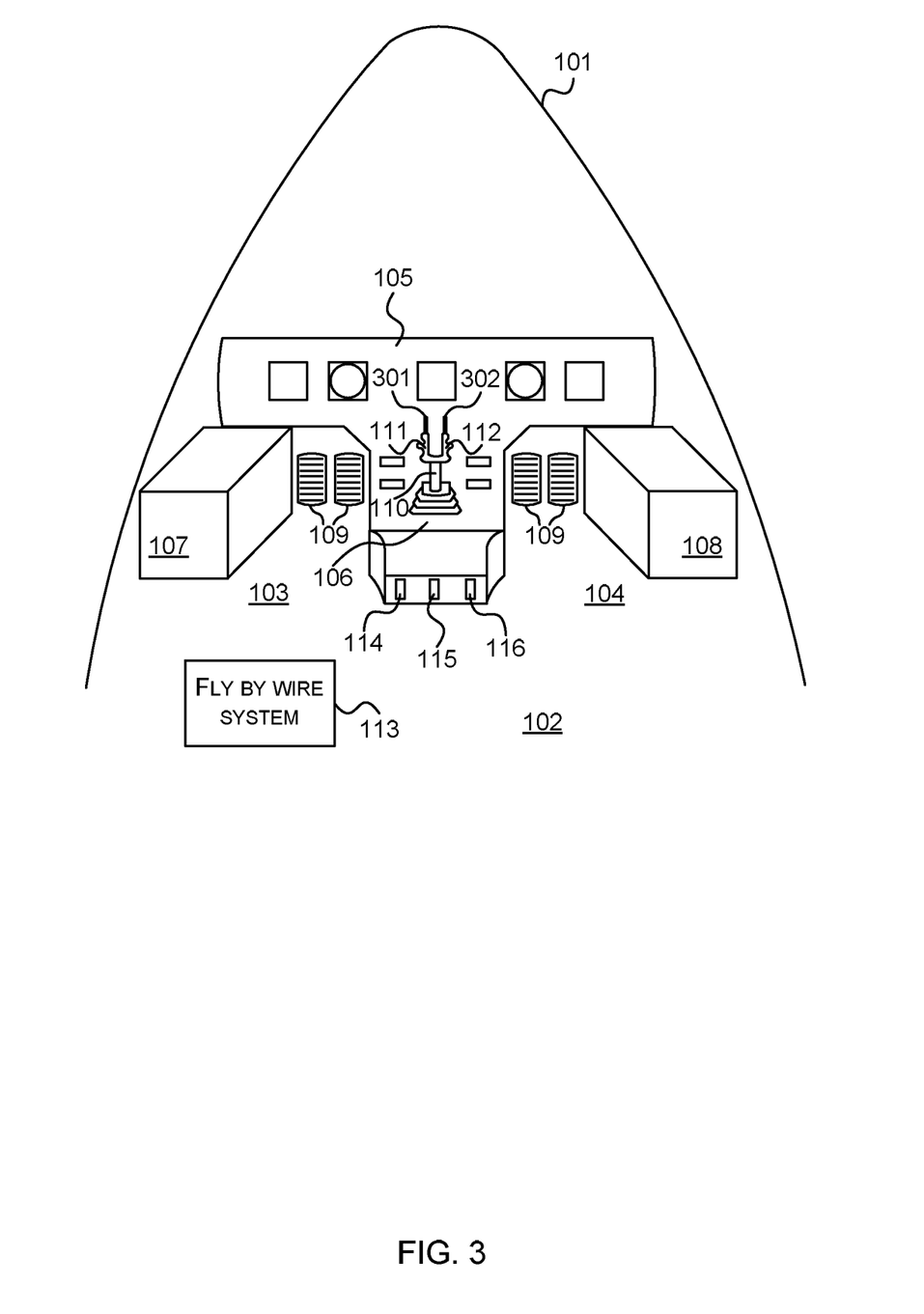
FIG. 3 is a simplified cutaway view of a part of an aircraft in accordance with a third embodiment showing a single, centrally mounted inceptor incorporating thrust control elements.

Referring now to FIG. 3 where like reference numerals refer to the same components as described above in relation to FIG. 1, throttle quadrants are dispensed with and thrust is now controlled by one of two thumb operated elements 301, 302 which are mounted respectively on grips 111, 112. The thumb operated elements 301, 302 may comprise small joysticks which are movable in a fore and aft direction and which incorporate position sensors which generate output signals for the fly by wire system 113 that includes appropriate thrust signals.

Figure 4:
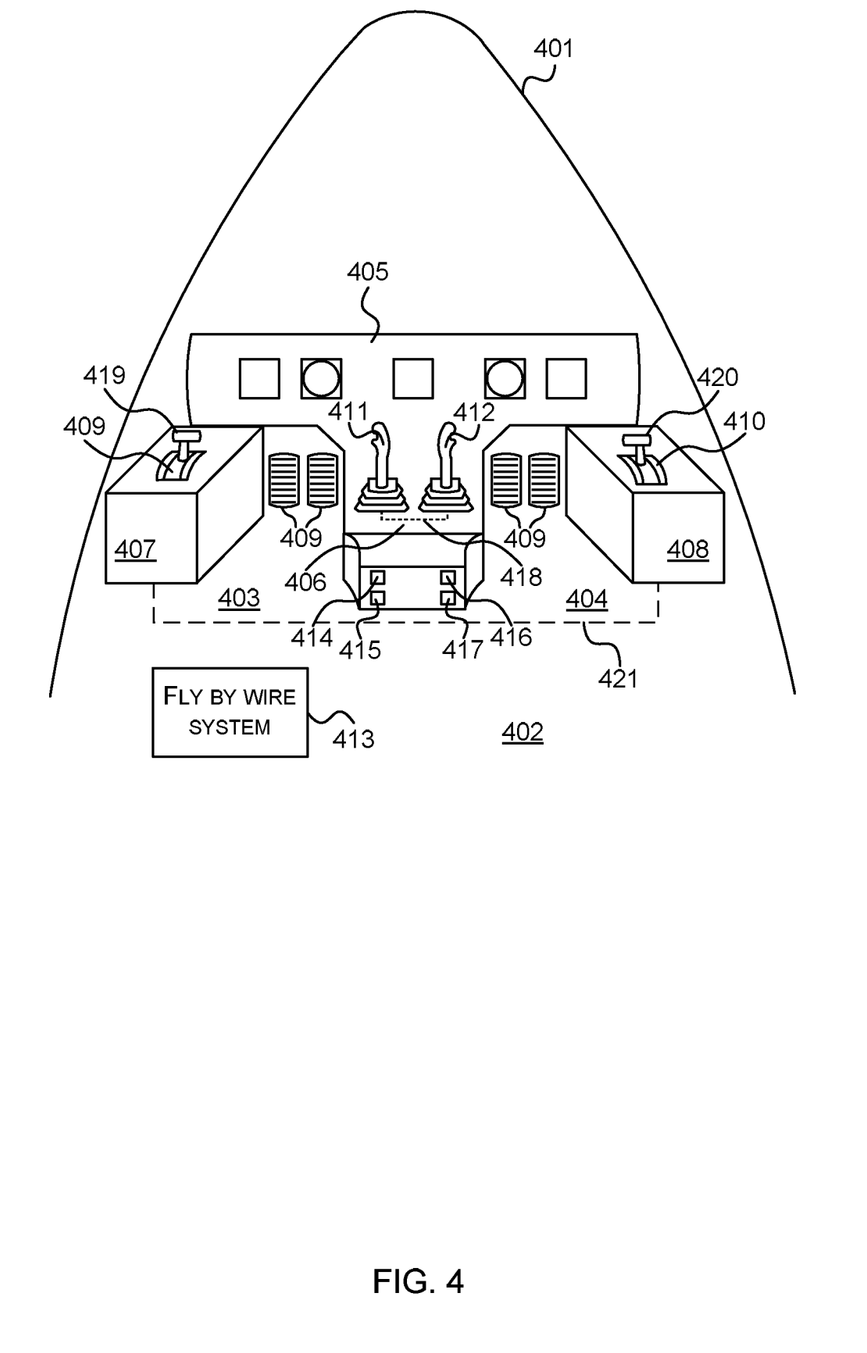
FIG. 4 is a simplified cutaway view of a part of an aircraft in accordance with a fourth embodiment showing two centrally mounted inceptors and mechanically linked outboard throttle quadrants.

Referring now to FIG. 4, an aircraft 401 includes a cockpit 402 where a pilot and co-pilot may be located at positions indicated by reference numerals 403 and 404 respectively. The cockpit 402 includes a display panel 405, centre console 406 and side consoles 407, 408. Rudder pedals 409 are provided for operation by the pilot and co-pilot. Mounted on the side consoles 407, 408 are throttle quadrant arrangements 409 410, respectively, positioned at outboard locations. Mounted on the centre console 406 are two control stick arrangements (or inceptors) 411 412 for operation by the pilot and co-pilot respectively. The two inceptors 411, 412 are mechanically linked, passive inceptors having fixed force feel characteristic provided by springs and dampers (not shown). Both inceptors 411, 412 are linked to a fly by wire system schematically represented by box 413 and are operable to control pitch and roll of the aircraft 401 in a conventional manner. For example, a fore and aft movement of either inceptor 411, 412 controls aircraft pitch and a sideways, left to right movement of either inceptor 411, 412 controls aircraft roll. Inputs made to the inceptor 411 by the pilot are monitored by force and position sensors 414, 415, respectively, located in the centre console. Inputs made to the inceptor 412 by the co-pilot are monitored by force and position sensors 416 417, respectively located in the centre console. The fly by wire system 413 is configured to sum the inputs of each inceptor 411, 412. In this embodiment, the two inceptors 411, 412 are linked together by way of a mechanical linkage represented by the dotted line 418 and located inside the centre console 406. The mechanical linkage 418 is arranged so that if either of the inceptors 411, 412 is moved, the other inceptor also moves in the same direction and by the same amount.

The first throttle quadrant arrangement 409 incorporates a first thrust lever 419 which can be moved in a fore and aft direction by the pilot, located at position 403, with the left hand. The second throttle quadrant arrangement 410 incorporates a second thrust lever 420 which can be moved in a fore and aft direction, by the co-pilot located at position 404, with the right hand. In this embodiment, the first and second throttle quadrant arrangements 409, 410 are linked together by way of a mechanical linkage represented by the dotted line 421 and located underneath the floor of the cockpit 402. The mechanical linkage 421 is arranged so that if either of the first and second thrust levers 419, 420 is moved, the other thrust lever also moves in the same direction and by the same amount.

Figure 5:
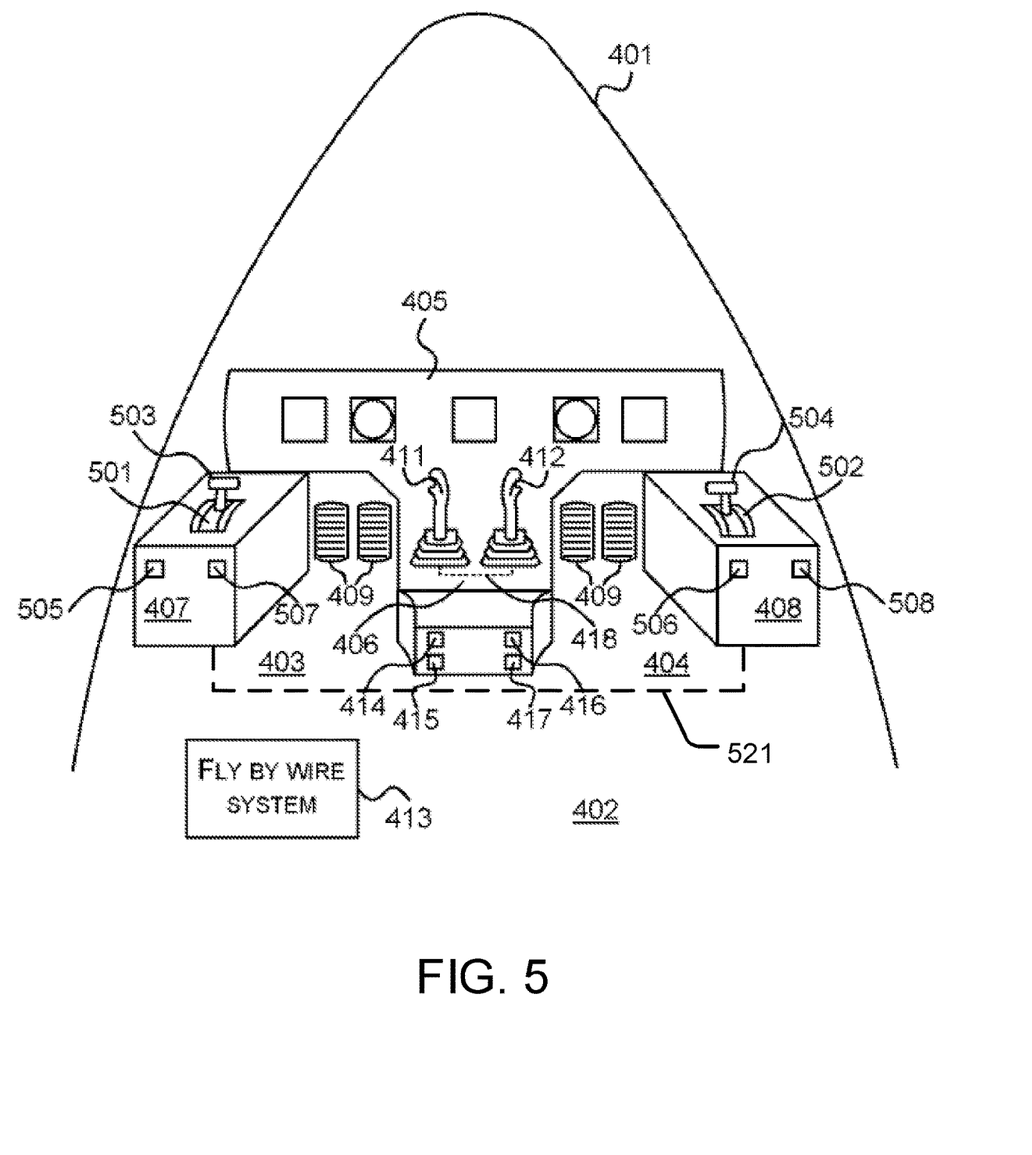
FIG. 5 is a simplified cutaway view of a part of an aircraft in accordance with a fifth embodiment showing two centrally mounted inceptors and electrically linked outboard throttle quadrants.

Referring now to FIG. 5 where like reference numerals refer to the same components as described above in relation to FIG. 4, first and second throttle quadrant arrangements 501, 502 are located respectively on the side consoles 407, 408 and are electrically linked as represented by the dotted line 521. The first throttle control arrangement 501 includes a first thrust lever 503 and the second throttle control arrangement 502 includes a second thrust lever 504. In this example, each throttle control arrangement 501, 502 is provided with a respective position sensor 505, 506 and with a respective drive motor 507, 508. When, for example the first thrust lever 503 is moved, the associated position sensor 505 detects the movement and a corresponding drive signal is provided to the drive motor 508 associated with the second throttle quadrant arrangement 502 in order to drive the second thrust lever 504 so that it follows the motion of the first thrust lever 503. Similarly, if the second thrust lever 504 is moved, the associated position sensor 506 detects the movement and a corresponding drive signal is provided to the drive motor 507 associated with the first throttle arrangement 501 so that it follows the motion of the second thrust lever 504.

Figure 6:
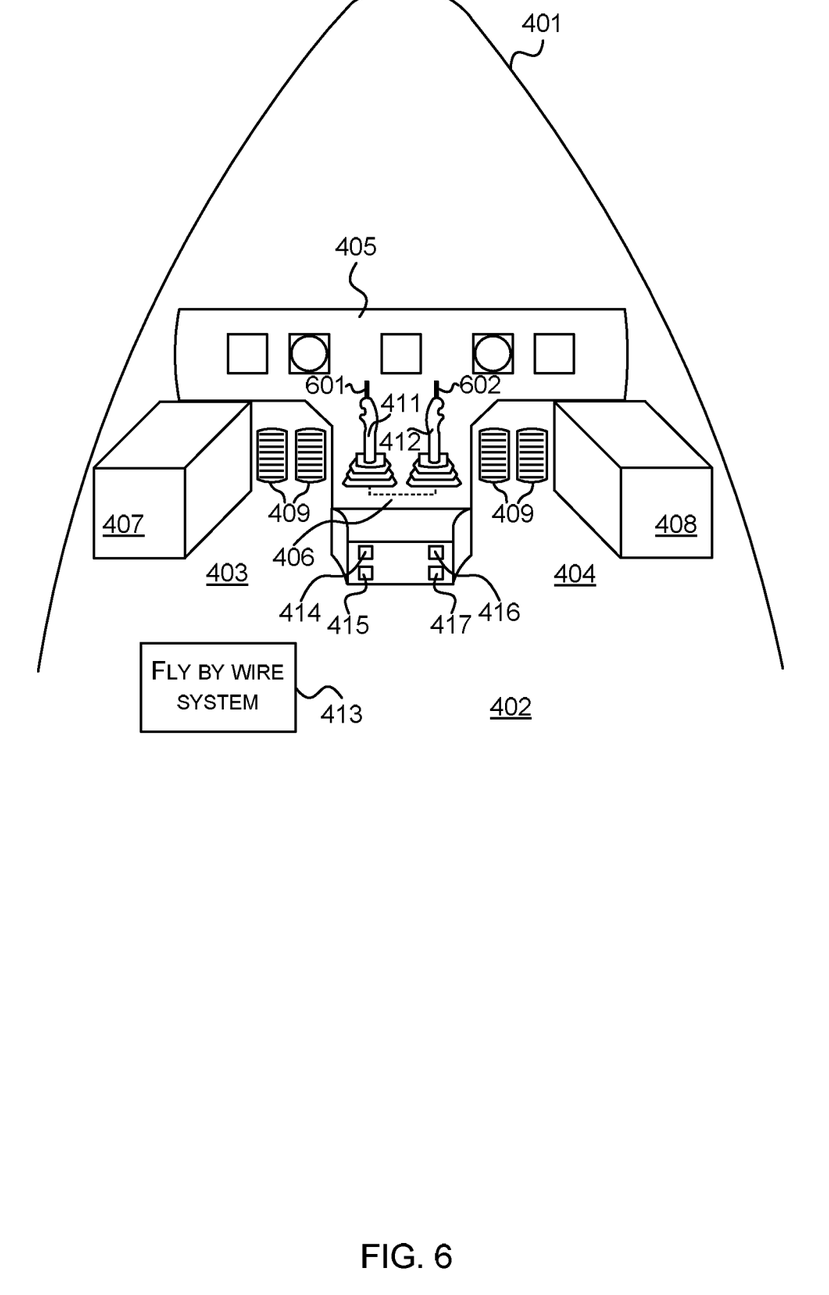
FIG. 6 is a simplified cutaway view of a part of an aircraft in accordance with a sixth embodiment showing two centrally mounted inceptors, each incorporating thrust control elements.

Referring now to FIG. 6 where like reference numerals refer to the same components as described above in relation to FIG. 4, throttle quadrants are dispensed with and thrust is now controlled by one of two thumb operated elements 601, 602 which are mounted respectively on the inceptors 411 and 412. The thumb operated elements 601, 602 may comprise small joysticks which are movable in a fore and aft direction and which incorporate position sensors which generate output signals for the fly by wire system 113.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. An aircraft comprising:
  a cockpit for occupation by two pilots seated side by side;
  a control stick for controlling pitch and roll of the aircraft, the control stick being located in a central region of the cockpit between the two pilots for operation by either or both of the two pilots; and
  first and second throttle quadrant arrangements positioned at outboard locations of the cockpit, wherein the first throttle quadrant is located to a left hand side of the two pilots, and the second throttle quadrant is located to a right hand side of the two pilots.

2. The aircraft according to claim 1, wherein the control stick includes first and second grips mounted in the same horizontal plane.

3. The aircraft according to claim 2, wherein the first and second grips are contoured so that the first grip can be operated by a left hand of one of the two pilots and the second grip can be operated by a right hand of another one of the two pilots.

4. The aircraft according to claim 1, wherein the control stick includes jam mitigation.

5. The aircraft according to claim 1, wherein the control stick is mounted in a centre console of the cockpit.

6. The aircraft according to claim 1, wherein the aircraft includes a fly by wire system which includes the control stick.

7. The aircraft according to claim 6, wherein the control stick includes at least one of a force sensor and a position sensor.

8. The aircraft according to claim 1, wherein the control stick is a first control stick, and wherein the aircraft further comprises a second control stick for controlling the pitch and the roll of the aircraft, the second control stick being located in the central region of the cockpit, the second control stick being adjacent to the first control stick.

9. The aircraft according to claim 8, further comprising a fly by wire system which includes the first control stick and the second control stick.

10. The aircraft according to claim 9, wherein the first control stick and the second control stick are each provided with at least one of a force sensor and a position sensor.

11. The aircraft according to claim 8, wherein the first control stick and the second control stick are mounted in a centre console of the cockpit.

12. The aircraft according to claim 8, wherein the first control stick and the second control stick are linked together.

13. The aircraft according to claim 12, wherein the first control stick and the second control stick are linked by a mechanical linkage.

14. The aircraft according to claim 12, wherein the first control stick and the second control stick are linked electrically.

15. The aircraft according to claim 8, wherein both first control stick and the second control stick each include a thrust control element.

16. The aircraft according to claim 1, further comprising a mechanical linkage for linking the first and second throttle quadrant arrangements together mechanically.

17. The aircraft according to claim 16, wherein the mechanical linkage is located above a floor of the cockpit.

18. The aircraft according to claim 1, wherein the first and second throttle quadrant arrangements are linked together.

19. The aircraft according to claim 18, wherein the first and second throttle quadrant arrangements are linked together electrically, and wherein the first and second throttle quadrant arrangements each include a respective position sensor and drive motor.

20. The aircraft according to claim 19, wherein the position sensor is configured to detect movement of the respective one of the first and second throttle quadrant arrangements and to provide a signal to the other one of the first and second throttle quadrant arrangements, and wherein the drive motor is configured to cause movement of the respective one of the first and second throttle quadrant arrangements based on the signal from the position sensor.

21. The aircraft according to claim 1, wherein the control stick includes at least one thrust control element.

22. The aircraft according to claim 21, wherein the thrust control element includes a thumb-operated element.

23. The aircraft according to claim 21, further comprising at least two thrust control elements which are either mechanically or electrically linked together.

\* \* \* \* \*